United States Patent
Ohta

(10) Patent No.: US 8,780,391 B2
(45) Date of Patent: Jul. 15, 2014

(54) IMAGE PROCESSING APPARATUS AND IMAGE PROCESSING SYSTEM WITH PROCESSABILITY DETERMINING UNIT

(75) Inventor: Shingo Ohta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 374 days.

(21) Appl. No.: 13/210,887

(22) Filed: Aug. 16, 2011

(65) Prior Publication Data
US 2012/0062942 A1 Mar. 15, 2012

(30) Foreign Application Priority Data
Sep. 9, 2010 (JP) ................................ 2010-202252

(51) Int. Cl.
*G06K 15/00* (2006.01)
(52) U.S. Cl.
USPC .......................................... 358/1.15; 358/1.1
(58) Field of Classification Search
USPC ................................. 358/1.15, 1.1
See application file for complete search history.

(56) References Cited

U.S. PATENT DOCUMENTS

| | | | |
|---|---|---|---|
| 6,833,927 B2 * | 12/2004 | Gusmano et al. | 358/1.15 |
| 6,983,306 B1 | 1/2006 | Sameshima et al. | |
| 2004/0177017 A1 | 9/2004 | Yamamoto et al. | |
| 2005/0267797 A1 * | 12/2005 | Takahashi et al. | 705/11 |
| 2007/0247653 A1 * | 10/2007 | Hayashi | 358/1.13 |

FOREIGN PATENT DOCUMENTS

| | | |
|---|---|---|
| JP | 2004-192077 | 7/2004 |
| JP | 2004-199300 | 7/2004 |
| JP | 3826735 | 9/2006 |
| JP | 4240695 | 3/2009 |
| JP | 2009-255390 | 11/2009 |

* cited by examiner

*Primary Examiner* — Benny Q Tieu
*Assistant Examiner* — Martin Mushambo
(74) *Attorney, Agent, or Firm* — IPUSA, PLLC

(57) ABSTRACT

An image processing apparatus is connected to other image processing apparatuses and a file server via a network and includes a document obtaining unit configured to obtain document data and attribute information including format information and generator apparatus information of the document data from the file server, a processability determining unit configured to determine whether the obtained document data are processable by the image processing apparatus based on the format information, an apparatus identifying unit configured to identify one of the other image processing apparatuses as a generator apparatus that has generated the document data based on the generator apparatus information if the processability determining unit determines that the obtained document data are not processable by the image processing apparatus, and a function obtaining unit configured to obtain a functional program for processing the document data from the generator apparatus.

6 Claims, 8 Drawing Sheets

FIG.4

| DOCUMENT NAME | CREATOR NAME | FORMAT | GENERATOR APPARATUS | LOCATION |
|---|---|---|---|---|
| DOCUMENT L | USER X | JPEG | MFP 2 | EAST SIDE OF 9TH FLOOR |
| DOCUMENT M | USER Y | TIFF | MFP 3 | CENTRAL ZONE OF 9TH FLOOR |
| DOCUMENT N | USER Z | PDF | MFP 1 | COPY ROOM |
| DOCUMENT O | USER X | XXX | MFP 2 | EAST SIDE OF 9TH FLOOR |
| DOCUMENT P | USER Y | TIFF | MFP 2 | EAST SIDE OF 9TH FLOOR |

IMAGE PROCESSING APPARATUS AND IMAGE PROCESSING SYSTEM WITH PROCESSABILITY DETERMINING UNIT

CROSS-REFERENCE TO RELATED APPLICATION

The present application is based upon and claims the benefit of priority of Japanese Patent Application No. 2010-202252, filed on Sep. 9, 2010, the entire contents of which are incorporated herein by reference.

BACKGROUND OF THE INVENTION

1. Field of the Invention

An aspect of this disclosure relates to an image processing apparatus and an image processing system.

2. Description of the Related Art

A multifunction peripheral (MFP) is a type of an image forming apparatus that includes functions of a digital copier, a facsimile machine, a printer, and a scanner and is used in various user environments.

Here, let us assume an environment where multiple MFPs and printers are connected to each other via a network, document data obtained by scanning documents with the MFPs are stored in a file sharing server, and the stored document data are output later using the MFPs or the printers. In such an environment, different MFPs on the network may generate document data in different file formats and this may cause a problem.

For example, let us assume a case where an MFP 1 scans a document to generate document data in the tagged image file format (TIFF) and stores the document data in a file sharing server, and a printer 1 is used to output (or print) the document data stored in the file sharing server. In this case, if the printer 1 does not support the file format (TIFF) of the document data, the printer 1 cannot output the document data.

Meanwhile, there is a known network distributed system where if an apparatus cannot provide some or all of services requested by the user, the apparatus finds other apparatuses that can provide the services and requests the found apparatuses to provide the services requested by the user.

For example, Japanese Laid-Open Patent Publication No. 2004-199300 discloses a distributed system where apparatuses connected via a network complement services of each other. The disclosed distributed system includes a search unit for searching multiple apparatuses to find resources necessary for a requested service, a determination unit for determining whether the found resources satisfy a resource publication policy, and a providing unit for providing the service by coordinating the resources that satisfy the resource publication policy.

As another example, Japanese Laid-Open Patent Publication No. 2004-192077 discloses a distributed system where an apparatus searches for other apparatuses that can provide a requested service. The disclosed distributed system includes a service scenario describing functions necessary to provide a service and the relationship between the functions in a general notation, a context that provides criteria for selecting apparatuses used to provide the service, an extracting unit for extracting the apparatuses necessary to provide the service from the service scenario, a detection unit for detecting apparatuses that are in locations where they can provide the service to a service requester, and a providing unit for providing the service to the service requester by coordinating the detected apparatuses based on the context.

If the disclosed technologies are applied to the above described environment, the printer 1 may be configured to find another printer or MFP supporting the TIFF format and to request the found printer or MFP to output the document data. Thus, the disclosed technologies allow the user to output the document data even if the printer 1 does not support the TIFF format.

However, the disclosed distributed systems have problems as described below. First, the disclosed configurations complicate a system. For example, the disclosed distributed systems require a unit (or function) to search for or detect apparatuses that provide necessary resources or services. It is generally preferable to simplify the configuration of a system and thereby to reduce the costs of the system.

Also with the disclosed configurations, if the user operates a first apparatus to perform a print process and the first apparatus requests a second apparatus to perform the print process, the user needs to move to the second apparatus to pick up the result of the print process (e.g., a printout). It is generally preferable and convenient for the user to obtain the result of the print process at the first apparatus that the user operates. Also, if many processes are concentrated on an apparatus that can provide a requested service, the performance of the system may be reduced.

SUMMARY OF THE INVENTION

In an aspect of this disclosure, there is provided an image processing apparatus connected to other image processing apparatuses and a file server via a network. The image processing apparatus includes a document obtaining unit configured to obtain document data and attribute information including format information and generator apparatus information of the document data from the file server, a processability determining unit configured to determine whether the obtained document data are processable by the image processing apparatus based on the format information, an apparatus identifying unit configured to identify one of the other image processing apparatuses as a generator apparatus that has generated the document data based on the generator apparatus information if the processability determining unit determines that the obtained document data are not processable by the image processing apparatus, and a function obtaining unit configured to obtain a functional program for processing the document data from the generator apparatus.

BRIEF DESCRIPTION OF THE DRAWINGS

FIG. 4 is a table illustrating exemplary attribute information;

DESCRIPTION OF THE PREFERRED EMBODIMENTS

Preferred embodiments of the present invention are described below with reference to the accompanying drawings.

<System Configuration>
(Network Configuration)

Figure 1:
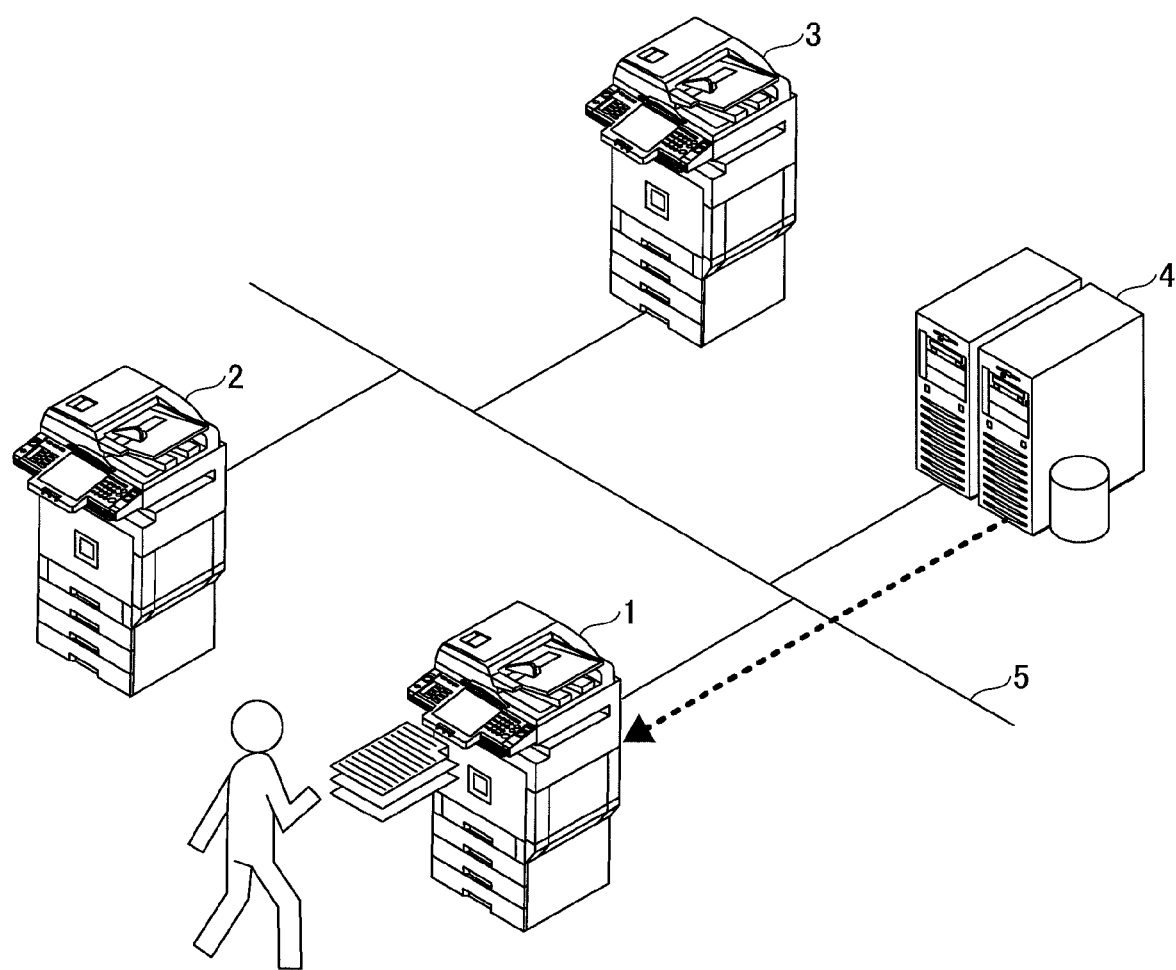
FIG. 1 is a drawing illustrating an exemplary configuration of a network according to an embodiment.

An exemplary configuration of a network (or a system) according to an embodiment is described below. FIG. 1 is a drawing illustrating an exemplary network configuration. In the exemplary network configuration, multifunction peripherals (MFPs) 1 through 3 and a file server 4 are connected via a network 5.

Each of the MFPs 1 through 3 is, for example, an image forming apparatus (or an image processing apparatus) including functions of a copier, a scanner, a printer, and a facsimile machine. The file server 4 is a file sharing server for storing various data such as document data. For example, document data obtained by scanning documents with the MFPs 1-3 are stored in the file server 4, and the MFPs 1-3 later retrieve the document data from the file server 4 to print the document data. The network 5 is, for example, a local area network (LAN), a wide area network (WAN), or a combination of a LAN and a WAN. The MFPs 1-3 and the file server 4 communicate with each other via the network 5.

In an exemplary process in the above described system, the MFP 2 generates document data and stores the document data in the file server 4 together with attribute information. Assuming that the MFP 1 tries to print the document data stored in the file server 4 but does not support the file format (or data format) of the document data, the MFP 1 obtains a functional program (supporting the file format) for processing the document data from the MFP 2 that has generated the document data and processes the document data using the functional program. In this process, the MFP 1 identifies the apparatus (i.e., the MFP 2) that has generated the document data based on the attribute information of the document data. Details of the process are described later.

The network configuration is not limited to that described above. For example, the number of MFPs is not limited to three and more than one file servers may be connected to the network 5. In the descriptions below, "MFP" may be used as a generic term for the MFPs 1-3 when there is no need to distinguish them.

(Hardware)

Figure 2:
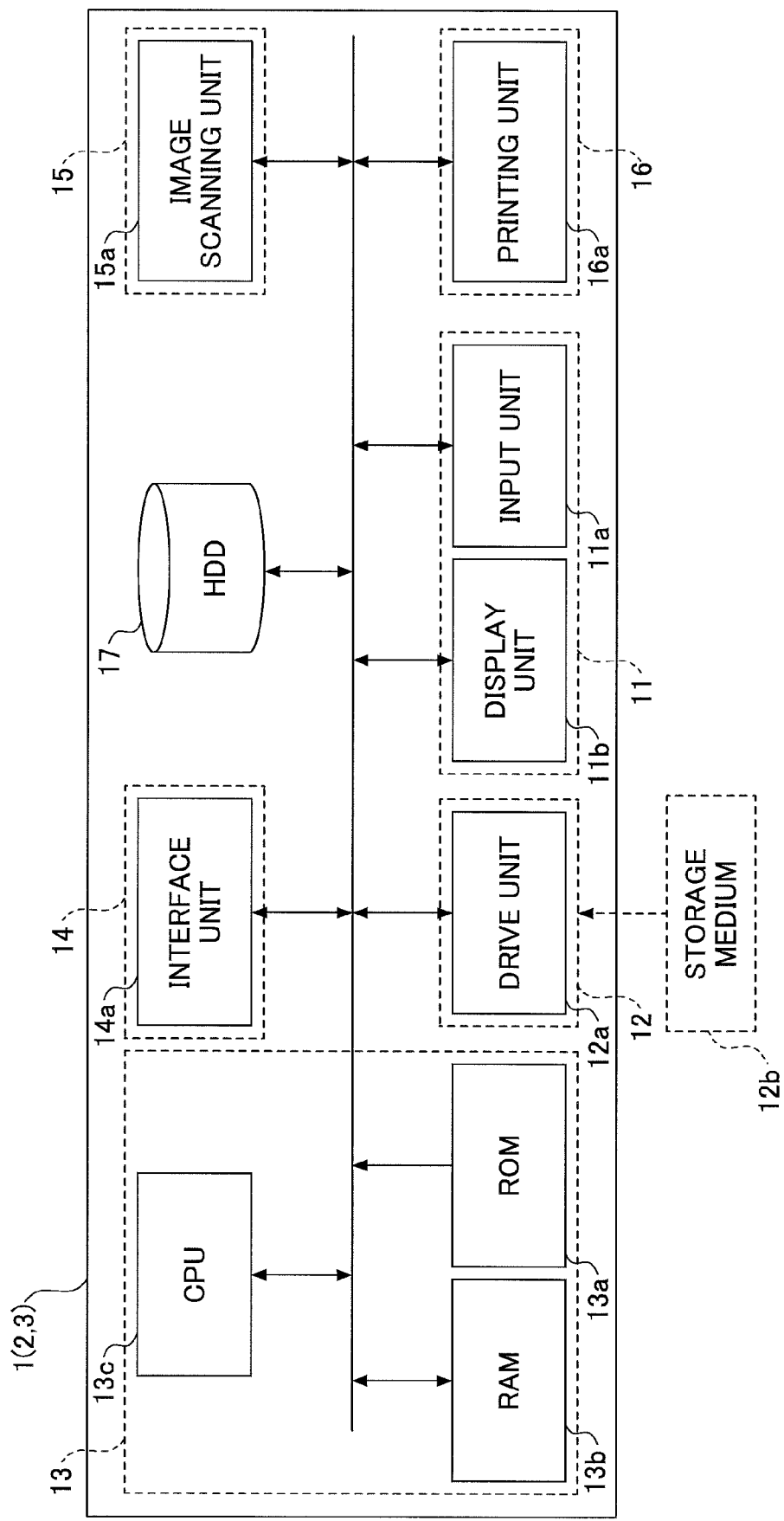
FIG. 2 is a block diagram illustrating an exemplary hardware configuration of an MFP.

An exemplary hardware configuration of the MFP of this embodiment is described below. FIG. 2 is a block diagram illustrating an exemplary hardware configuration of the MFP. The MFP includes an operations panel 11, a storage medium I/F 12, a controller 13, a data communication I/F 14, a scanner 15, a plotter 16, and a hard disk drive (HDD) 17 that are connected to each other.

The operations panel 11 includes an input unit 11a and a display unit 11b. The input unit 11a includes, for example, hardware keys and is used to operate the MFP. The display unit 11b, for example, includes a display and is used to display various types of information related to image forming operations. The data communication I/F 14 includes an interface unit 14a and connects the MFP to data communication lines such as a LAN, a WAN, and a facsimile communication line. The HDD 17 stores various data such as document data, scanned image data, and application data. The HDD 17 manages the stored data using, for example, a file system and/or a database (DB).

The HDD 17 may also store data input from a storage medium 12b. The storage medium 12b is mounted on a drive unit 12a of the storage medium I/F 12. Data are read from the storage medium 12b by the drive unit 12a and stored in the HDD 17.

The controller 13 includes a read only memory (ROM) 13a, a random access memory (RAM) 13b, and a central processing unit (CPU) 13c. The ROM 13a stores programs to be executed when the MFP is started and various data related to the programs. The RAM 13b temporarily stores programs and data read from the ROM 13a and the HDD 17. The CPU 13c executes the programs temporarily stored in the RAM 13b. For example, when print data are received via the data communication I/F 14, the CPU 13c of the controller 13 loads a program (PDL parser) that can interpret a page description language (PDL) of the print data from the ROM 13a into the RAM 13b and executes the program to interpret the print data and generate a bitmap image.

The scanner 15 includes an image scanning unit 15a that optically scans a document placed on a scanning surface to generate image data. The plotter 16 includes a printing unit 16a that prints a bitmap image on a recording medium such as paper through, for example, an electrophotographic process.

With the hardware configuration as described above, the MFP of this embodiment provides basic image forming functions such as copying, scanning, printing, and facsimile transmission.

(Functional Configuration)

Figure 3:
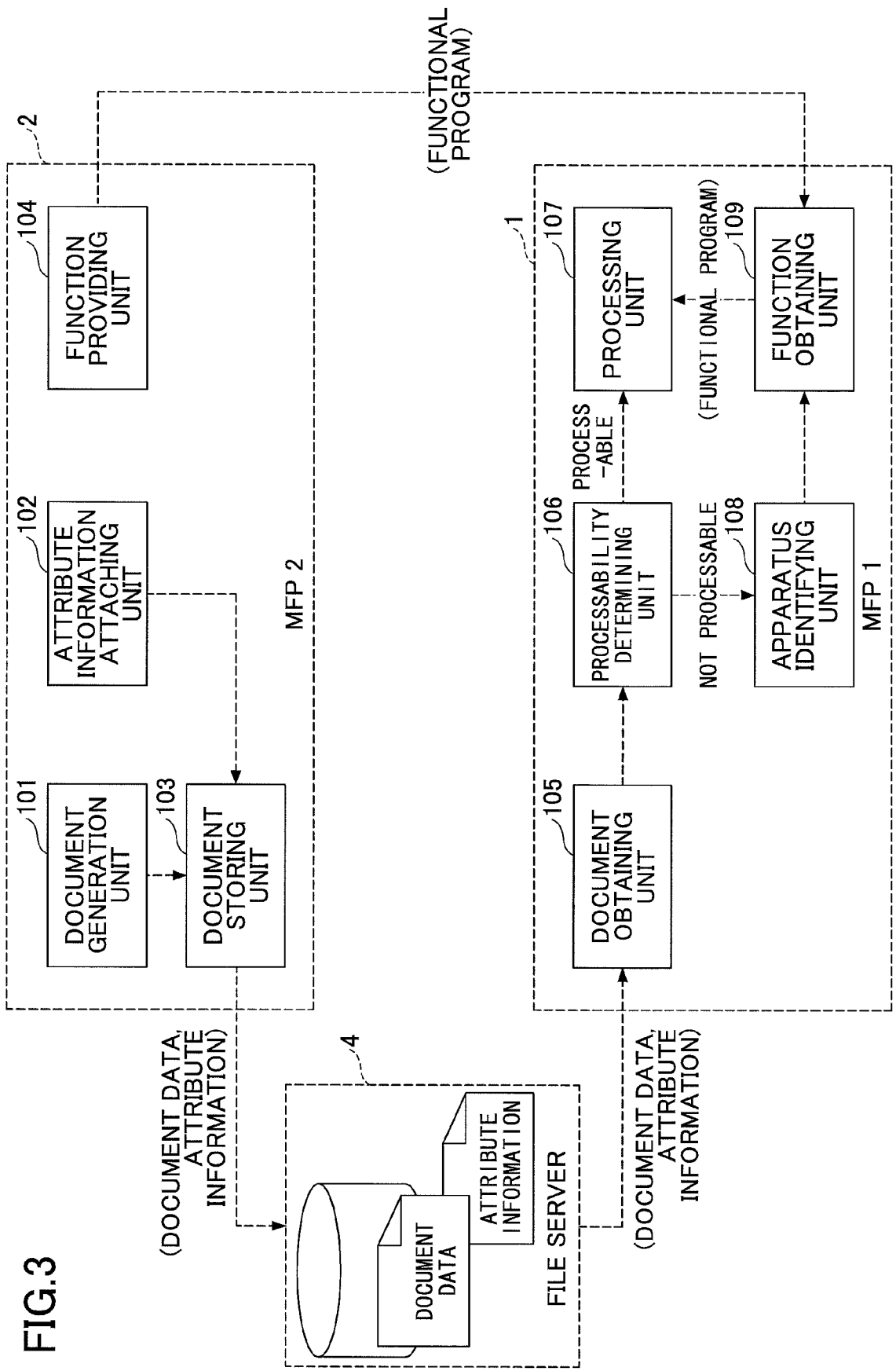
FIG. 3 is a block diagram illustrating an exemplary functional configuration of an MFP.

An exemplary functional configuration of the MFP is described below. FIG. 3 is a block diagram illustrating an exemplary functional configuration of the MFP. As illustrated in FIG. 3, the MFP may include a document generation unit 101, an attribute information attaching unit 102, a document storing unit 103, a function providing unit 104, a document obtaining unit 105, a processability determining unit 106, a processing unit 107, an apparatus identifying unit 108, and a function obtaining unit 109. In FIG. 3, it is assumed that the MFP 1 obtains a function (functional program) from the MFP2. Therefore, in FIG. 3, the MFP 2 includes the functional units 101 through 104 and the MFP 1 includes the functional units 105 through 109.

However, each of the MFPs may include all the functional units 101 through 109. In this case, the MFPs selectively use the functional units that are necessary for their roles (e.g., for providing a function or for requesting a function).

In an exemplary process, the MFP 2 generates document data and stores the document data in the file server 4 together with attribute information. The MFP 1 obtains the document data stored in the file server 4, but cannot process (or print) the document data since the MFP 1 does not support the file format of the document data. Therefore, the MFP 1 obtains a functional program (supporting the file format) for processing the document data from the MFP 2 that has generated the document data and processes the document data using the functional program.

The document generation unit 101 generates document data in a predetermined file format that the MFP 2 supports.

The attribute information attaching unit 102 attaches attribute information to the generated document data. The attribute information includes format information indicating the file format of the document data and generator apparatus information indicating a generator apparatus that has generated the document data. In this example, the format information indicates "TIFF" and the generator apparatus information indicates "MFP 2".

The document storing unit 103 stores the document data and the attribute information in the file server 4.

The function providing unit 104 provides a functional program for processing the document data in the predetermined file format in response to a request for the functional program. In this example, it is assumed that the MFP 2 generates the document data in the TIFF format and includes a functional program that can process the document data in the TIFF format. Accordingly, when a request for the functional program is received from the MFP 1, the function providing unit 104 of the MFP 2 provides the functional program to the MFP 1.

The document obtaining unit 105 obtains the document data and the attribute information from the file server 4. In this example, the document obtaining unit 105 of the MFP 1 obtains the document data from the file server 4 to print the document data.

The processability determining unit 106 determines whether the document data are "processable" (can be processed) by the MFP that has obtained the document data based on the format information in the attribute information. That is, the processability determining unit 106 determines whether the file format indicated by the format information is supported by the corresponding MFP. In this example, it is assumed that the MFP 1 does not support the TIFF format. Therefore, the processability determining unit 106 of the MFP 1 determines that the document data are not processable.

The processing unit 107 processes the document data obtained from the file server 4. If the MFP that has obtained the document data supports the file format of the document data, the processing unit 107 can process the document data. In this example, however, it is assumed that the MFP 1 does not support the TIFF format, and therefore the processing unit 107 cannot process the document data.

The apparatus identifying unit 108 identifies the generator apparatus that has generated the document data based on the generator apparatus information in the attribute information if the processability determining unit 106 determines that the document data are not processable. In this example, the apparatus identifying unit 108 determines that the generator apparatus is the MFP 2.

The function obtaining unit 109 obtains the functional program for processing the document data in the predetermined file format from the identified generator apparatus. That is, when the document data are not processable, the function obtaining unit 109 obtains a functional program that supports a file format (in this example, TIFF) of the document data from an apparatus (in this example, the MFP 2) that has generated the document data.

The above described functional units are implemented, for example, by executing programs by the CPU 13c of the MFP.

(Attribute Information)

FIG. 4 illustrates exemplary attribute information. As described above, the file server 4 stores document data generated by the MFPs in association with attribute information. The attribute information is attached to each set of document data and at least includes format information and generator apparatus information of the document data. In an example described below, the attribute information also includes a document name, a creator name, and a location of the MFP.

In this example, it is assumed that document data of five documents "document L", "document M", "document N", "document O", and "document P" are stored in the file server 4. As illustrated in FIG. 4, attribute information of each set of document data includes information items "document name", "creator name" (user who has created the document), "format" (file format), "generator apparatus", and "location" (location of the generator apparatus). The document name may be replaced with any identifier of document data such as a document ID or a document file name.

<First Embodiment>

Figure 5:
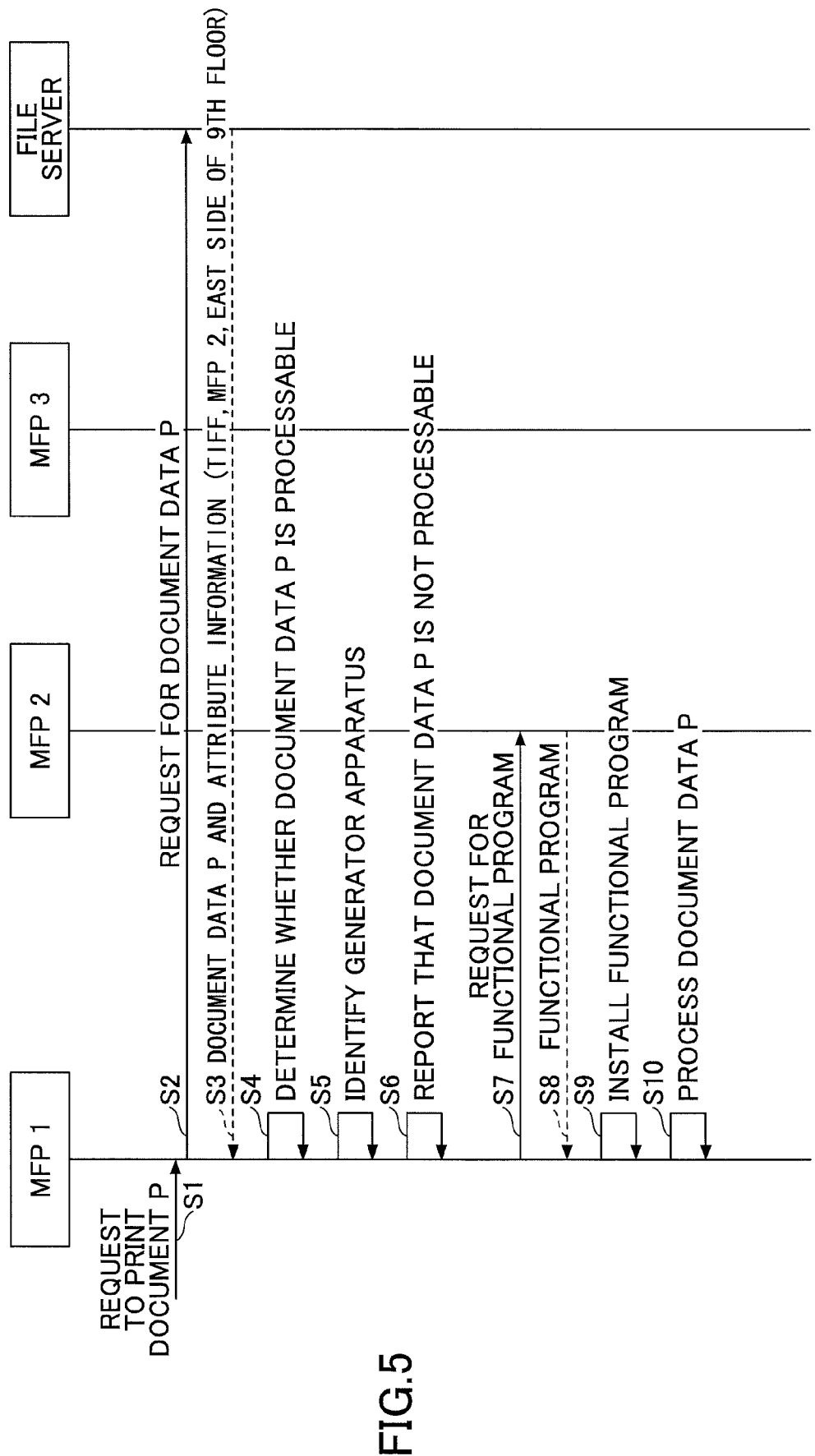
FIG. 5 is a sequence chart illustrating an exemplary process performed by an MFP according to a first embodiment.

FIG. 5 is a sequence chart illustrating an exemplary process performed by the MFP according to a first embodiment. In this exemplary process, the MFP 2 generates document data and stores the document data in the file server 4 together with attribute information. Next, the MFP 1 obtains the document data from the file server 4. Since the MFP 1 does not support the file format of the document data, the MFP 1 cannot process (e.g., print) the document data. Therefore, the MFP 1 obtains a functional program (that supports the file format) for processing the document data from the MFP 2 that has generated the document data and processes the document data using the functional program. This process is described in more detail below with reference to FIG. 5. In this exemplary process, it is assumed that document data and attribute information as illustrated in FIG. 4 are stored in the file server 4.

In step S1, the user requests the MFP 1 to print a document P.

In step S2, the MFP 1 sends a request for document data P of the document P to the file server 4.

In step S3, in response to the request, the file server 4 sends the document data P and its attribute information to the MFP 1. Here, it is assumed that the attribute information includes "TIFF" as the file format, "MFP 2" as the generator apparatus, and "East Side of 9th Floor" as the location.

In step S4, the MFP 1 determines whether the document data P in the TIFF format are processable. Here, it is assumed that the MFP 1 does not support the TIFF format and the document data P are not processable. Meanwhile, if the document data are processable, the process may proceed to step S10.

If the document data P are not processable, the process proceeds to step S5. In step S5, the MFP 1 identifies the generator apparatus that has generated the document data P based on the generator apparatus information in the attribute information. In this example, the generator apparatus information indicates "MFP 2" and therefore the MFP 2 is identified as the generator apparatus.

Figure 6:
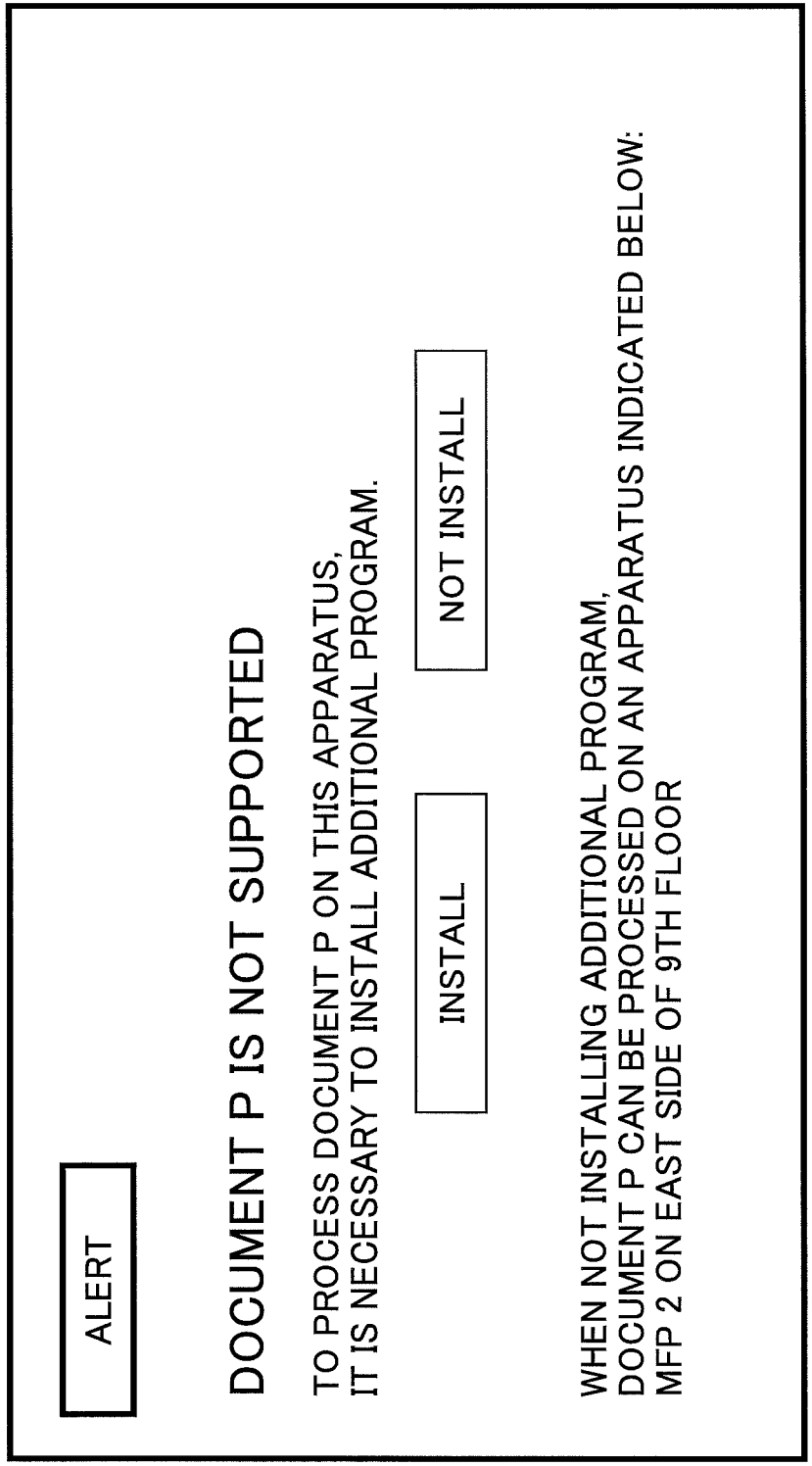
FIG. 6 is a drawing illustrating an exemplary display screen.

In step S6, the MFP 1 reports to the user that the obtained document data P are not processable. For example, the MFP 1 displays a screen on the display unit 11b of the operations panel 11. FIG. 6 illustrates an exemplary display screen. The display screen includes a message reporting that the document P (or the document data P) is not processable or supported. The display screen also includes buttons "Install" and "Not Install". When the user presses "Install", the process proceeds to step S7 to obtain and install a functional program. The display screen further includes information indicating an apparatus that can process the document P and its location. In this example, "MFP 2" located in "East Side of 9th Floor" is displayed based on the attribute information.

In step S7, the MFP 1 sends a request for a functional program for processing the document data P in the TIFF format to the MFP 2 identified as the generator apparatus. The MFP 2 that has generated the document data P naturally includes a functional program that supports the file format (in this example, TIFF) of the document data P. The MFP 1 can process the document data P using the functional program obtained from the MFP 2. This configuration eliminates the need for the MFP 1 to search for an apparatus on the network 5 which has a functional program supporting the TIFF file format.

In step S8, in response to the request from the MFP 1, the MFP 2 sends the functional program to the MFP 1. Here, the MFP 2 may be configured to store the request for the functional program in a job queue and to process the request as one of the jobs (i.e., according to a job execution order of the job queue) instead of immediately responding to the request. This configuration eliminates the need for the MFP 2 to suspend a preceding job that is being executed. Also, treating the request as a normal job makes it possible to simplify the resource control.

In step 9, the MFP 1 installs the obtained functional program supporting the TIFF format (as a plug-in). As a result, the MFP 1 becomes capable of processing the document data P in the TIFF format.

In step S10, the MFP 1 processes the document data P, i.e., prints the document P.

Thus, in this embodiment, if an MFP does not have a function to process document data generated by another apparatus, the MFP identifies the generator apparatus that has generated the document data based on attribute information of the document data, obtains a functional program for processing the document data from the identified generator apparatus, and installs the obtained functional program. This configuration enables a user to freely select an apparatus (e.g., MFP) to process a document without taking into account what functions are included in the apparatus and without taking into account whether the document is generated by the apparatus.

<Second Embodiment>

Figure 7:
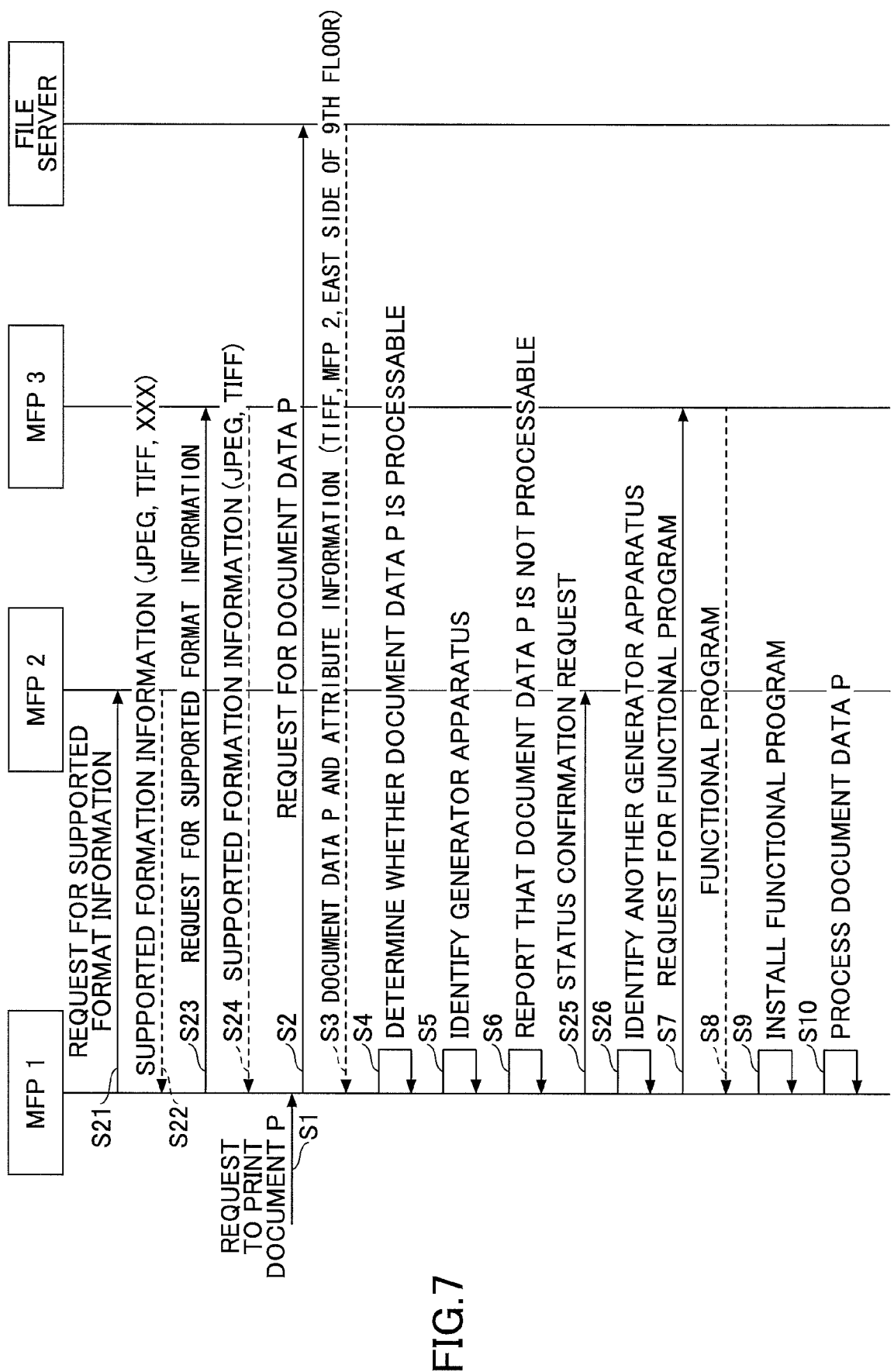
FIG. 7 is a sequence chart illustrating an exemplary process performed by an MFP according to a second embodiment.

FIG. 7 is a sequence chart illustrating an exemplary process performed by the MFP according to a second embodiment. In this exemplary process, the MFP 1 obtains document data from the file server 4. Since the MFP 1 does not support the file format of the document data and cannot process (e.g., print) the document data, the MFP 1 tries to obtain a functional program (supporting the file format) for processing the document data from the MFP 2 that has generated the document data. If the MFP 1 cannot obtain the functional program from the MFP 2, the MFP 1 obtains the functional program from the MFP 3 and processes the document data using the obtained functional program. This process is described in more detail below with reference to FIG. 7. In FIG. 7, the same reference numbers as in FIG. 5 (first embodiment) are assigned to the steps that correspond to the steps in FIG. 5 and descriptions of those steps are omitted.

In step S21, the MFP 1 periodically requests the MFP 2 to send supported format information indicating file formats supported by the MFP 2. This enables the MFP 1 to know file formats supported by the MFP 2 in advance.

In step S22, the MFP 2 sends the supported format information to the MFP 1. In this example, it is assumed that the supported format information of MFP 2 includes "JPEG", "TIFF", and "XXX" (a proprietary format).

In step S23, the MFP 1 periodically requests the MFP 3 to send supported format information indicating file formats supported by the MFP 3. This enables the MFP 1 to know file formats supported by the MFP 3 in advance. Similarly, the MFP 1 periodically requests all MFPs on the network 5 to send supported format information. In this embodiment, the MFP 1 may include a format information obtaining unit for obtaining supported format information from the MFPs.

In step S24, the MFP 3 sends the supported format information to the MFP 1. In this example, it is assumed that the supported format information of MFP 3 includes "JPEG" and "TIFF". Descriptions of subsequent steps S1 through S6 are omitted here.

In step S25, the MFP 1 sends a status confirmation request to confirm the status of the MFP 2 identified as the generator apparatus before sending a request for a functional program for processing the document data P in the TIFF format. Here, it is assumed that the MFP 2 is not able to respond to the status confirmation request, i.e., not able to respond to a request for the functional program for some reason. For example, when no response is received from the MFP 2 for a predetermined period of time (time out) or an error message is received from the MFP 2, the MFP 1 determines that the MFP 2 is unable to respond to a request for the functional program. Alternatively, the MFP 1 may send a request for a functional program and determine that the MFP 2 is unable to respond to the request for the functional program if the request fails.

In step S26, the MFP 1 identifies another "generator apparatus" that can process the document data P in the TIFF format based on the supported format information obtained from the MFPs (in steps S21 through S24). In this example, it is assumed that the MFP 3 is identified as the generator apparatus the can process the document data P in the TIFF format. The MFP 3 is not the apparatus that has actually generated the document data P. However, since the MFP 1 is configured to obtain a functional program from a "generator apparatus", the MFP 1 assumes that the MFP 3 is the "generator apparatus". In step S7, the MFP 1 sends a request for the functional program for processing the document data P in the TIFF format to the MFP 3 identified as the generator apparatus. Then, steps S8 through S10 are performed and the document data P are printed on the MFP 1.

With this configuration, even if a functional program is not obtained from an actual generator apparatus, the MFP 1 can identify another apparatus having the functional program based on supported format information obtained in advance from MFPs on the network 5 and obtain the functional program from the identified apparatus. Thus, this configuration makes it possible to more reliably obtain a functional program. Thus, the second embodiment also enables a user to freely select an apparatus (e.g., MFP) to process a document without taking into account what functions are included in the apparatus and without taking into account whether the document is generated by the apparatus.

<Third Embodiment>

Figure 8:
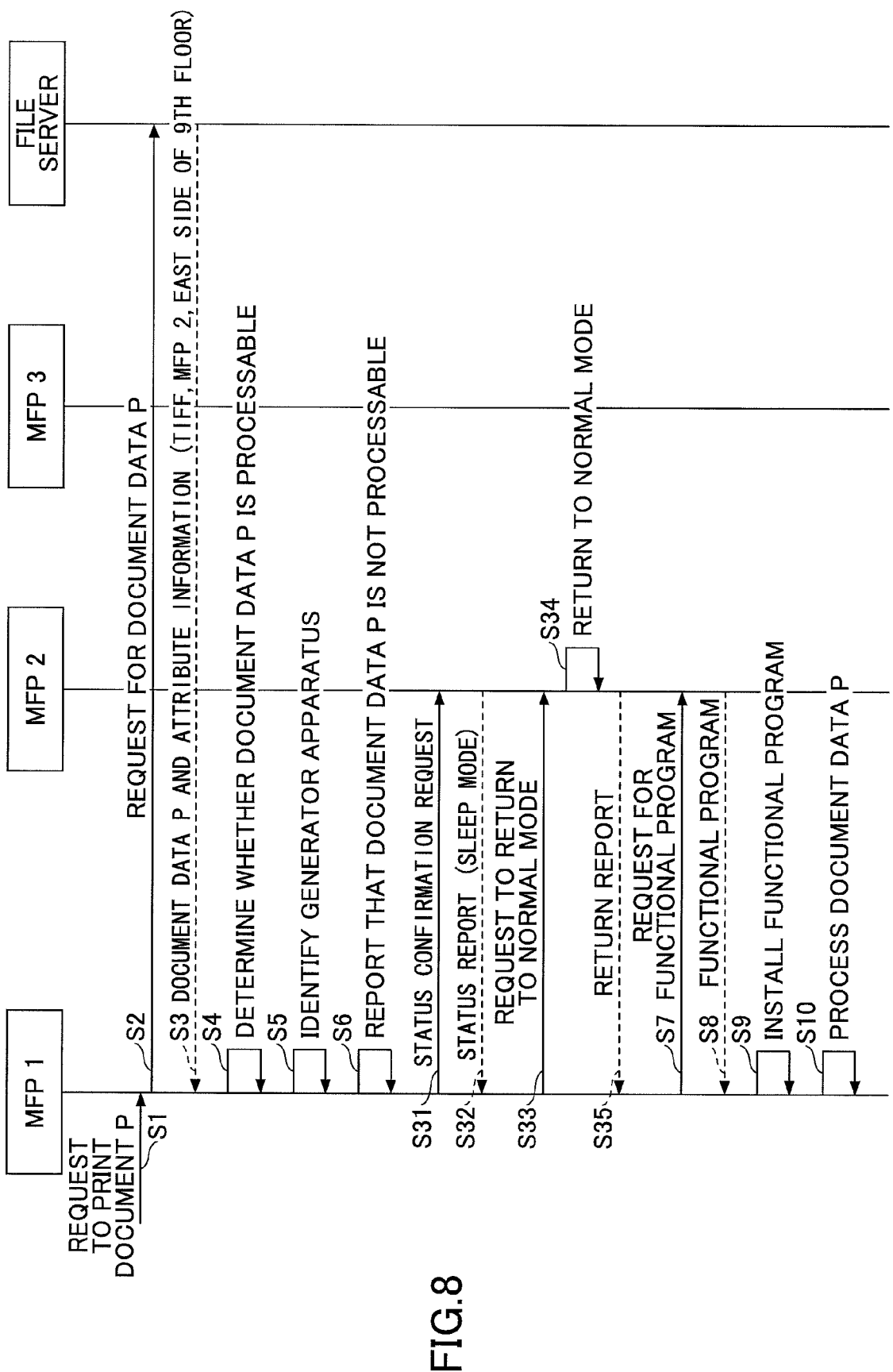
FIG. 8 is a sequence chart illustrating an exemplary process performed by an MFP according to a third embodiment.

FIG. 8 is a sequence chart illustrating an exemplary process performed by the MFP according to a third embodiment. In this exemplary process, the MFP 1 obtains document data from the file server 4. Since the MFP 1 does not support the file format of the document data and cannot process (e.g., print) the document data, the MFP 1 tries to obtain a functional program (supporting the file format) for processing the document data from the MFP 2 that has generated the document data. However, since the MFP 2 is in a sleep mode (or an energy saving mode), the MFP 1 requests the MFP 2 to return to a normal mode and then obtains the functional program from the MFP 2. This process is described in more detail below with reference to FIG. 8. In FIG. 8, the same reference numbers as in FIG. 5 (first embodiment) are assigned to the steps that correspond to the steps in FIG. 5 and descriptions of those steps are omitted.

In step S31, the MFP 1 sends a status confirmation request to confirm the status of the MFP 2 identified as the generator apparatus before sending a request for a functional program for processing the document data P in the TIFF format. Here, it is assumed that the MFP 2 is in the sleep mode where the MFP 2 cannot perform its normal functions.

In step S32, the MFP 2 sends a status report (indicating the sleep mode) to the MFP 1.

In step S33, the MFP 1 sends the MFP 2 a request to return to a normal mode where the MFP 2 can perform its normal functions.

In S34, the MFP 2 returns (or transitions) from the sleep mode to the normal mode. In the normal mode, the MFP 2 can respond to a request for, the functional program.

In step S35, the MFP 2 sends a return report indicating the return to the normal mode to the MFP 1. In step S7, the MFP 1 sends a request for the functional program for processing the document data P in the TIFF format to the MFP 2. Then, steps S8 through S10 are performed and the document data P are printed on the MFP 1.

With this configuration, even if a generator apparatus is in a sleep mode (or an energy saving mode), the MFP 1 can request the generator apparatus to return to a normal mode and then obtain a functional program from the generator apparatus. Thus, the third embodiment also enables a user to freely select an apparatus (e.g., MFP) to process a document without taking into account what functions are included in the apparatus and without taking into account whether the document is generated by the apparatus.

As described above, an aspect of this disclosure makes it possible to simplify the configurations of an image processing apparatus and an image processing system where the image processing apparatus can process document data generated by another apparatus in a format not supported by the image processing apparatus.

The present invention is not limited to the specifically disclosed embodiments, and variations and modifications may be made without departing from the scope of the present invention. Also, the above described embodiments may also be applied to a method, a system, a computer program, and a storage medium storing the computer program.

What is claimed is:

1. An image processing apparatus connected to other image processing apparatuses and a file server via a network, the image processing apparatus comprising:
   a document obtaining unit configured to obtain document data and attribute information of the document data from the file server, the attribute information including format information indicating a format of the document data and generator apparatus information indicating a generator apparatus that has generated the document data;
   a processability determining unit configured to determine whether the obtained document data are processable by the image processing apparatus based on the format information;
   an apparatus identifying unit configured to identify one of the other image processing apparatuses as the generator apparatus based on the generator apparatus information if the processability determining unit determines that the obtained document data are not processable by the image processing apparatus; and
   a function obtaining unit configured to obtain a functional program for processing the document data in the format from the generator apparatus,
   wherein if the generator apparatus is in an energy saving mode, the function obtaining unit is configured to request the generator apparatus to return to a normal mode before obtaining the functional program from the generator apparatus.

2. The image processing apparatus as claimed in claim 1, further comprising:
   a format information obtaining unit configured to obtain supported format information from the other image processing apparatuses, the supported format information indicating formats supported by the other image processing apparatuses, wherein
   if the functional program is not obtainable from the generator apparatus, the function obtaining unit obtains the functional program from one of the other image processing apparatuses different from the generator apparatus based on the supported format information.

3. The image processing apparatus as claimed in claim 1, wherein when the document data are not processable, the processability determining unit is configured to report to a user that the document data are not processable.

4. The image processing apparatus as claimed in claim 1, wherein when the document data are not processable, the processability determining unit is configured to display a screen on a display unit of the image processing apparatus to allow a user to select whether to install the functional program.

5. The image processing apparatus as claimed in claim 4, wherein the screen further includes information on one or more of the other image processing apparatuses that are capable of processing the document data.

6. An image processing system, comprising:
   a first image processing apparatus;
   a second image processing apparatus; and
   a file server,
   wherein the first image processing apparatus, the second image processing apparatus, and the file server are connected to each other via a network;
   wherein the first image processing apparatus includes
      a document generation unit configured to generate document data in a predetermined format,
      an attribute information attaching unit configured to attach attribute information to the generated document data, the attribute information including format information indicating the predetermined format and generator apparatus information indicating the first image processing apparatus,
      a document storing unit configured to store the document data and the attribute information in the file server, and
      a function providing unit configured to provide a functional program for processing the document data in the predetermined format in response to a request for the functional program;
   wherein the second image processing apparatus includes
      a document obtaining unit configured to obtain the document data and the attribute information from the file server,
      a processability determining unit configured to determine whether the obtained document data are processable by the second image processing apparatus based on the format information,
      an apparatus identifying unit configured to identify the first image processing apparatus that has generated the document data based on the generator apparatus information if the processability determining unit determines that the obtained document data are not processable by the second image processing apparatus, and
      a function obtaining unit configured to obtain the functional program from the identified first image processing apparatus,
      wherein if the first image processing apparatus is in an energy saving mode, the function obtaining unit is configured to request the first image processing apparatus to return to a normal mode before obtaining the functional program from the identified first image processing apparatus.

* * * * *